(12) United States Patent
Ke

(10) Patent No.: US 12,452,627 B2
(45) Date of Patent: *Oct. 21, 2025

(54) METHOD FOR LOCATION SERVICE CONTROL AND COMMUNICATIONS UNIT

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,099

(22) Filed: May 29, 2024

(65) Prior Publication Data

US 2024/0314518 A1    Sep. 19, 2024

Related U.S. Application Data

(63) Continuation of application No. 17/460,550, filed on Aug. 30, 2021, now Pat. No. 12,028,774, which is a
(Continued)

(30) Foreign Application Priority Data

Mar. 1, 2019    (CN) .......................... 201910157347.X

(51) Int. Cl.
*H04W 4/02*    (2018.01)
*H04W 4/029*   (2018.01)
(Continued)

(52) U.S. Cl.
CPC ........... *H04W 4/025* (2013.01); *H04W 4/029* (2018.02); *H04W 12/02* (2013.01); *H04W 52/0216* (2013.01); *H04W 52/0248* (2013.01);

(58) Field of Classification Search
CPC ..... H04L 63/108; H04L 67/303; H04L 67/52; H04W 12/02; H04W 12/37; H04W 12/61;
(Continued)

(56) References Cited

U.S. PATENT DOCUMENTS 7,427,952 B2 * 9/2008 Bull ...................... G01S 5/0226
                                                          342/453
10,123,249 B2 * 11/2018 Sakoda ................ H04W 40/30
(Continued)

FOREIGN PATENT DOCUMENTS

CN    101523236 A    9/2009
CN    103596172 A    2/2014
(Continued)

OTHER PUBLICATIONS

3rd Generation Partnership Project, "Technical Specification Group Services and System Aspects System Aspects; Technical Report Enhanced support for User Privacy in location services (Release 5)", 3GPP TR 23.871 V5.0.0 (Jul. 2002), Valbonne, France.
(Continued)

*Primary Examiner* — Nader Bolourchi
(74) *Attorney, Agent, or Firm* — Price Heneveld LLP

(57) ABSTRACT

A method for location service control and a communications unit are provided. The method includes: transmitting information related to a first valid time and/or control information, where the control information is used to control related behavior of obtaining location of a terminal.

13 Claims, 4 Drawing Sheets

Related U.S. Application Data continuation of application No. PCT/CN2020/077253, filed on Feb. 28, 2020.

(51) Int. Cl.
*H04W 12/02* (2009.01)
*H04W 52/02* (2009.01)

(58) Field of Classification Search
CPC ....... H04W 4/02; H04W 4/025; H04W 4/029; H04W 52/0216; H04W 52/0248; H04W 64/00; H04W 8/16; Y02D 30/70
See application file for complete search history.

(56) References Cited

U.S. PATENT DOCUMENTS

| | | | |
|---|---|---|---|
| 2004/0176104 A1 | 9/2004 | Arcens | |
| 2006/0262011 A1 | 11/2006 | Bull et al. | |
| 2007/0270166 A1* | 11/2007 | Hampel | H04L 51/222 455/456.3 |
| 2010/0136903 A1 | 6/2010 | Lee et al. | |
| 2012/0202517 A1* | 8/2012 | Edge | H04L 63/0281 455/456.1 |
| 2015/0223027 A1 | 8/2015 | Ahn et al. | |
| 2016/0050703 A1* | 2/2016 | Johnsson | H04W 8/005 370/329 |
| 2016/0148100 A1* | 5/2016 | Chang | G06Q 50/26 706/12 |
| 2016/0205609 A1 | 7/2016 | Sakoda et al. | |
| 2016/0309300 A1* | 10/2016 | Dong | H04W 4/023 |
| 2018/0098276 A1 | 4/2018 | Livanos et al. | |
| 2019/0037338 A1 | 1/2019 | Edge et al. | |
| 2021/0272535 A1* | 9/2021 | Takahashi | G04G 9/0076 |

FOREIGN PATENT DOCUMENTS

| | | |
|---|---|---|
| CN | 103826237 A | 5/2014 |
| CN | 104618896 A | 5/2015 |
| CN | 104620125 A | 5/2015 |
| CN | 104717126 A | 6/2015 |
| CN | 105208215 A | 12/2015 |
| CN | 105474703 A | 4/2016 |
| CN | 105930738 A | 9/2016 |
| CN | 106210048 A | 12/2016 |
| CN | 107766098 A | 3/2018 |
| CN | 108885529 A | 11/2018 |
| CN | 109379715 A | 2/2019 |
| EP | 3076727 A1 | 8/2014 |
| JP | H0918934 A | 1/1997 |
| TW | 201630457 A | 8/2016 |
| WO | 2014210250 A1 | 12/2014 |
| WO | 2015105277 A1 | 7/2015 |

OTHER PUBLICATIONS

Third Generation Partnership Project, "Technical Specification Group Services and System Aspects; 5G System Location Services (LCS) (Release 16)", 3GPP TS 23.273 V0.1.0, Jan. 2019, Valbonne, France.

* cited by examiner

METHOD FOR LOCATION SERVICE CONTROL AND COMMUNICATIONS UNIT

CROSS-REFERENCE TO RELATED APPLICATIONS

This application claims the benefit of and is a continuation application of U.S. patent application Ser. No. 17/460,550 filed on Aug. 30, 2021 which is a continuation application of PCT International Application No. PCT/CN2020/077253 filed on Feb. 28, 2020, which claims priority to Chinese Patent Application No. 201910157347.X, filed in China on Mar. 1, 2019, the disclosures of which are incorporated in their entireties by reference herein.

TECHNICAL FIELD

Embodiments of this disclosure relate to the field of communications technologies, and in particular, to a method for location service control and a communications unit.

BACKGROUND

In location services in the related art, a network needs to obtain locations of terminals. For example, based on a location service request of a location service client, the network performs location measurement on the terminal or requests the terminal to perform location measurement. However, in an actual application, a user of the terminal may not want to disclose a location of the user to the location service client. Therefore, the terminal may frequently reject a network request for obtaining the terminal location, resulting in waste of transmission resources occupied by signalling and power consumption of the terminal. It can be learned that there are problems of waste of transmission resources and power consumption in current location services.

SUMMARY

Embodiments of this disclosure provide a method for location service control and a communications unit, so as to resolve the problems of waste of transmission resources and power consumption in current location services.

According to a first aspect, an embodiment of this disclosure provides a method for location service control, applied to a first communications unit and including:
 transmitting information related to a first valid time and/or control information, where the control information is used to control related behavior of obtaining location of a terminal.

According to a second aspect, an embodiment of this disclosure provides a method for location service control, applied to a second communications unit and including:
 receiving information related to a first valid time and/or control information, where the control information is used to control related behavior of obtaining location of a terminal; and
 performing, based on the information related to the first valid time and/or the control information, a location service related operation.

According to a third aspect, an embodiment of this disclosure further provides a first communications unit, including:
 a transmitting module, configured to transmit information related to a first valid time and/or control information, where the control information is used to control related behavior of obtaining location of a terminal.

According to a fourth aspect, an embodiment of this disclosure further provides a second communications unit, including:
 a receiving module, configured to receive information related to a first valid time and/or control information, where the control information is used to control related behavior of obtaining location of a terminal; and
 an execution module, configured to perform, based on the information related to the first valid time and/or the control information, a location service related operation.

According to a fifth aspect, an embodiment of this disclosure further provides a communications unit, including: a processor, a memory, and a program stored in the memory and capable of running on the processor, where when the program is executed by the processor, the steps of the method for location service control on the first communications unit side according to the embodiments of this disclosure are implemented, or the steps of the method for location service control on the second communications unit side according to the embodiments of this disclosure are implemented.

According to a sixth aspect, an embodiment of this disclosure further provides a computer-readable storage medium, where a computer program is stored in the computer-readable storage medium, and when the computer program is executed by a processor, the steps of the method for location service control on the first communications unit side according to the embodiments of this disclosure are implemented, or the steps of the method for location service control on the second communications unit side according to the embodiments of this disclosure are implemented.

In this way, in the embodiments of this disclosure, the information related to the first valid time and/or the control information are transmitted, where the control information is used to control related behavior of obtaining location of the terminal, so as to support the terminal to provide control on location privacy information, and avoid frequent update of location privacy information or frequent enquiry for privacy verification, thereby reducing some insignificant signaling overheads, reducing transmission resources, and reducing power consumption of the terminal. In addition, the information related to the first valid time is transmitted, to effectively control validity of the control information. This further avoids frequent update of location privacy information or frequent enquiry for privacy verification, or avoids a case in which the terminal location cannot be obtained all the time, thereby improving control effects on obtaining the location of the terminal.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

Figure 1:
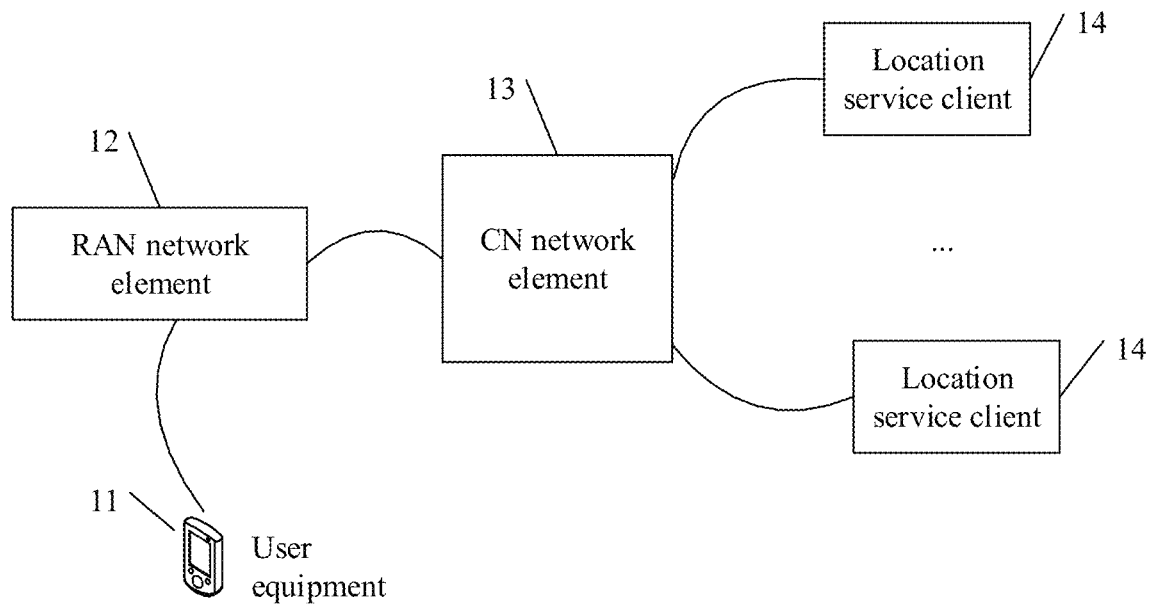
FIG. 1 is a structural diagram of a control system for location acquisition to which embodiments of this disclosure are applicable.

Referring to FIG. 1, FIG. 1 is a structural diagram of a control system for location acquisition to which the embodiments of this disclosure are applicable. As shown in FIG. 1, the control system includes a terminal 11, a radio access network (RAN) network element 12, a core network (CN) network element 13, and at least one location service client 14. The terminal 11 may be referred to as UE (User Equipment), for example, may be a terminal-side device such as a mobile phone, a tablet computer (Tablet Personal Computer), a laptop computer, a personal digital assistant (PDA), a mobile Internet device (MID), or a wearable device. It should be noted that a specific type of the terminal 11 is not limited in the embodiments of this disclosure.

It should be noted that a specific type of the RAN network element 12 is not limited in the embodiments of this disclosure. The terminal 11 may communicate with the CN network element 13 through the RAN network element 12. In addition, the location service client 14 may transmit a location service request to the CN network element 13, and the CN network element 13 may respond to or reject the location service request. In addition, the location service client 14 may be an application function (AF), or may be a third-party device and/or software, such as a commercial third-party device or a third-party (such as a public security bureau) device and/or software for emergency services.

Specific functions of the terminal 11, the RAN network element 12, the CN network element point 13, and the location service client 14 (which may include the AF) are described in detail by using the following plurality of embodiments.

In an optional embodiment of this disclosure, a communications unit may include at least one of the following: a communications network element, a terminal, and a location service client.

In an optional embodiment of this disclosure, the communications network element may include at least one of the following: a core network element and a radio access network element.

In the embodiments of this disclosure, the core network element (CN network element) may include but is not limited to at least one of the following: a core network device, a core network node, a core network function, a core network element, a mobility management entity (MME), an access mobility management function (AMF), a session management function (SMF), a user plane function (UPF), a serving gateway (serving GW, SGW), a PDN gateway (PDN Gate Way), a policy control function (PCF), a policy and charging rules function unit (PCRF), a GPRS serving support node (Serving GPRS Support Node, SGSN), a gateway GPRS support node (GGSN), a unified data management (UDM), a Unified Data Repository (UDR), an application function (AF), a location service management function (Location Management Function, LMF), an enhanced serving mobile location center (E-SMLC), a gateway mobile location center (GMLC), and a network exposure function (NEF).

In the embodiments of this disclosure, the RAN network element may include but is not limited to at least one of the following: a radio access network device, a radio access network node, a radio access network function, a RAN network element, a 3GPP radio access network, a non-3GPP radio access network, a centralized unit (CU), a distributed unit (DU), a base station, an evolved NodeB (eNB), a 5G NodeB (gNB), a radio network controller (RNC), a NodeB (NodeB), a non-3GPP interworking function (Non-3GPP Inter Working Function, N3IWF), an access controller (AC) node, an access point (AP) device, a wireless local area network (WLAN) node, or an N3IWF.

The base station may be a base transceiver station (BTS) in a Global System for Mobile Communications (GSM) or Code Division Multiple Access (CDMA), may be a base station (NodeB) in WCDMA, or may be an evolved NodeB (eNB or e-NodeB) in LTE, or a 5G NodeB (gNB). This is not limited in the embodiments of this disclosure.

In the embodiments of this disclosure, the UE is a terminal. The terminal may include a relay that supports a terminal function, or a terminal that supports a relay function. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal is not limited in the embodiments of this disclosure.

In addition, it should be noted that control information in this disclosure may be one of the following information:

privacy information of a user and/or terminal about obtaining location of the terminal;

privacy information of the user and/or terminal about location service (LCS, location serving);

control information about obtaining location of the terminal; and control information used for controlling related behavior of obtaining location of the terminal.

In an optional embodiment of this disclosure, the location service request specific to the terminal may be construed as a location service request for obtaining the location of the terminal; and the location service request specific to the terminal may be construed as a location service request for obtaining the location of the terminal.

In some implementations, the control information described herein may also be construed as tendency information of the terminal and/or user about related behavior of obtaining location of the terminal, or may be construed as tendency information of the terminal and/or user about obtaining location of the terminal.

In some implementations, the location service client described herein may be a source that transmits the location service request, such as an LCS, an AF, a network exposure function (NEF), or a next generation radio access network (NG RAN) node.

In an optional embodiment of this disclosure, the location service request may be construed as a request for obtaining the location of the terminal. In addition, it should be noted that "allow" in this disclosure may also be referred to as enable. "Not allow" in this disclosure may also be referred to as one of the following: disable or prohibit.

In addition, in the embodiments of this disclosure, all exchanged information between the terminal and the CN network element may be forwarded or transparently transmitted through a radio access network.

In addition, the network element in this specification may represent a network entity and/or a network function. A CN network element may represent a core network entity and/or core network function. The radio access network node may represent a radio access network entity and/or radio access network function. The mobility management unit may represent a mobility management entity/mobility management unit. The location service management unit may represent a location service management entity/location service management unit.

In addition, this disclosure describes that a verification request or verification process for obtaining the location of the terminal may be requesting the terminal to determine whether obtaining the location of the terminal is allowed, for example, may be a verification request for privacy permission of obtaining location of the terminal, or may be a verification request whether obtaining the location of the terminal is allowed based on tendency of the terminal.

In some implementations, on the terminal side, "subsequent" in this specification may mean after the terminal transmits the control information. In some implementations, on the network unit side, "subsequent" in this specification may mean after the network unit receives the control information.

Figure 2:
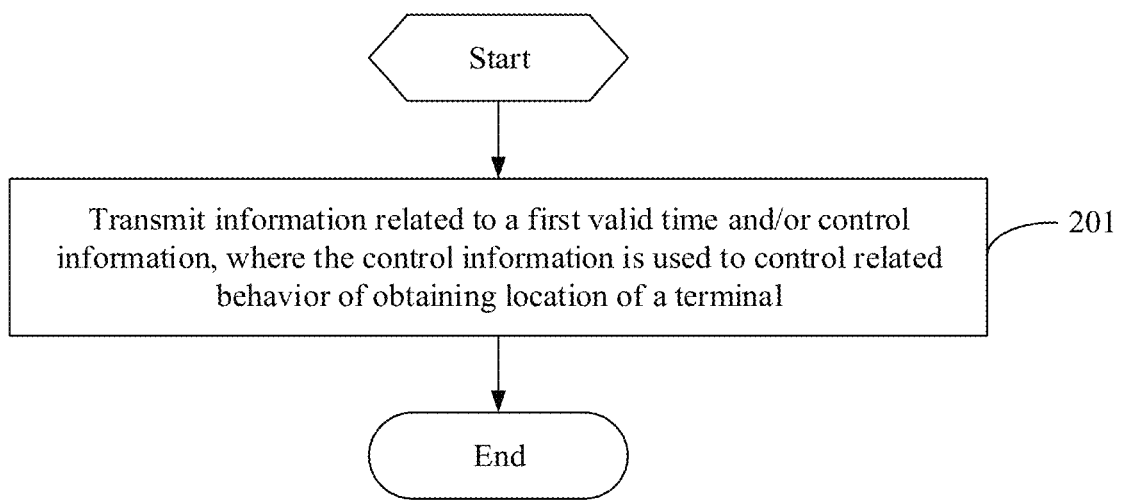
FIG. 2 is a flowchart of a method for location service control according to an embodiment of this disclosure.

Referring to FIG. 2, FIG. 2 is a flowchart of a method for location service control according to an embodiment of this disclosure, applied to a first communications unit. The first communications unit includes but is not limited to at least one of the following: a terminal and an AF. As shown in FIG. 2, the following steps are included.

Step 201: Transmit information related to a first valid time and/or control information, where the control information is used to control related behavior of obtaining location of a terminal.

Specifically, the information related to the first valid time and/or the control information is information related to the first valid time and/or control information that are related to the terminal. Step 201 may be transmitting the information related to the first valid time and the control information, or may be transmitting the control information, where the control information includes the information related to the first valid time.

Optionally, the control information may include at least one of the following: the information related to the first valid time;

first indication information, where the first indication information indicates at least one of the following: whether related behavior of obtaining location of the terminal is allowed, whether subsequent related behavior of obtaining location of the terminal is allowed, whether a subsequent location service request specific to the terminal is allowed, that a subsequent location service request specific to the terminal is allowed, and that a subsequent location service request specific to the terminal is not allowed; and second indication information, where the second indication information indicates at least one of the following: whether the first indication information is applicable to all location service clients; information related to a location service client to which the control information is applicable; and information related to a location service client for which the control information is not applicable.

In an implementation, the information related to the first valid time and/or the control information is information per terminal related to the first valid time and/or control information per terminal. The control information per terminal may be applied to location service requests from all location service clients or from a plurality of location service clients.

In another implementation, the information related to the first valid time and/or the control information is information per location service client related to the first valid time and/or control information per location service client. In other words, for different location service clients, the control information may be different, and the first valid time corresponding to the control information may be different.

In an implementation, the control information may include at least one of the following: control information per terminal and control information per location service client.

Optionally, the control information per terminal may include at least one of the following:

the information related to the first valid time;

first indication information, where the first indication information indicates at least one of the following: whether related behavior of obtaining location of the terminal is allowed, whether subsequent related behavior of obtaining location of the terminal is allowed, whether a subsequent location service request specific to the terminal is allowed, that a subsequent location service request specific to the terminal is allowed, and that a subsequent location service request specific to the terminal is not allowed; and second indication information, where the second indication information indicates at least one of the following: whether the first indication information is applicable to all location service clients; information related to a location service client to which the control information is applicable; and information related to a location service client for which the control information is not applicable.

In a case that the control information includes the information related to the first valid time, the information related to the first valid time may be applied to other information than the information related to the first valid time in the control information. That is, first valid information may be information related to a valid time of the other information. For example, the other information is the first indication information. The first valid information may be information related to a valid time of the first indication information.

The location service client may be a source that transmits a location service request, such as an LCS, an AF, an NEF, or an NG RAN.

In addition, the location service client to which the control information is applicable may be a list of location service clients to which the control information is applicable. Therefore, the information related to the location service client to which the control information is applicable may be information related to one or more location service clients.

In addition, the location service client for which the control information is not applicable may be a list of location service clients for which the control information is not applicable. Therefore, the information related to the location service client for which the control information is not applicable may be information related to one or more location service clients.

Optionally, the location service client to which the control information is applicable may mean that the location service request from the location service client is applicable to the first indication information. For example, in a case that the first indication information indicates that the location service request is not allowed, the location service request from the location service client to which the control information is applicable is not allowed. For example, in a case that the first indication information indicates that the location service request is allowed, the location service request from the location service client to which the control information is applicable is allowed.

Optionally, the location service client for which the control information is not applicable may mean that the location service request from the location service client is not applicable to the first indication information. For example, in a case that the first indication information indicates that the location service request is not allowed, a location service request from the location service client for which the control information is not applicable, a location service request for which privacy verification is requested from the terminal, or a location service request unknown to be allowed or not is allowed. For example, in a case that the first indication information indicates that the location service request is allowed, a location service request from the location service client for which the control information is not applicable, a location service request for which privacy verification is requested from the terminal, or a location service request unknown to be allowed or not is not allowed.

In an implementation, the first indication information may include both indication information that a subsequent location service request specific to the terminal is allowed and indication information that a subsequent location service request for obtaining the location of the terminal is not allowed. The two pieces of indication information may correspond to different applicable and/or exceptional location service clients, that is, different information related to location service clients to which the control information is applicable, and/or different information related to location service clients to which the control information is not applicable.

In an implementation, when the control information does not include at least one of the following, the control information is applicable to all location service clients: information about the location service client to which the control information is applicable, and information about the location service client for which the control information is not applicable.

Optionally, the control information per location service client may include at least one of the following:
  information related to a location service client;
  the information related to the first valid time; and
  third indication information, where the third indication information indicates at least one of the following: whether a subsequent location service request specific to the terminal is allowed, where the location service request comes from the location service client.

In an implementation, the information related to the first valid time is information related to a valid time for the control information, and the control information is the control information per location service client.

Optionally, the information related to the location service client, the information related to the location service client to which the control information is applicable, and/or the information related to the location service client to which the control information is applicable may include at least one of the following: an identifier of the location service client, a name of the identifier of the location service client, a domain name address of the identifier of the location service client, an identifier of a location service client requester, a name of the location service client requester, an IP address of the location service client requester, a port number of a location service client application, and a type of a location request from the location service client.

It is easy to understand that filtering of location service clients that are allowed or not allowed to obtain the location of the terminal can be implemented by indicating information related to an applicable location service client. It is easy to learn that the terminal may prohibit excessively frequent location acquisition by setting information related to a location service client that is allowed, information related to a location service client that is not allowed, and so on. For example, based on the type of client, only a location request for an emergency service can be allowed, or only a location request from a location service client that is trusted by a user or preset by the UE is allowed.

In addition, the control information may be applicable to all location service clients or part of location service clients. In an implementation, when the control information does not include a location service client involved, the control information may be applicable to location service requests from all location service clients.

In an implementation, the information related to the first valid time includes the information related to the valid time for the control information. The information related to the first valid time may further include at least one of the following: information related to a valid time for the control information per terminal, and information related to a valid time for the control information per location service client. The first valid time may be an information element different from the control information, or may be included in the control information.

Optionally, the information related to the first valid time includes at least one of the following: time period information for the control information and valid duration of the control information, where the time period information for the control information is used to indicate a valid time period for the control information. The time period information may also be referred to as valid time period information for the control information. The control information may be other information than the information related to the first valid time in the control information.

In an implementation, when the information related to the first valid time does not exit, the control information remains valid all the time.

Optionally, the time period information for the control information includes at least one of the following:
  a start-of-validity time for the control information, an end-of-validity time for the control information, and a loss-of-validity time for the control information.

That is, the valid time period for the control information may be indicated by at least one of the start-of-validity time for the control information, the end-of-validity time for the control information, and the loss-of-validity time for the control information.

In an implementation, the valid time period for the control information is between the start-of-validity time for the control information and the end-of-validity time for the control information. When the valid time period information for the control information does not include the start-of-validity time, a time of transmitting or receiving the control information is the start-of-validity time.

In another implementation, the valid time period for the control information is from the time of transmitting or receiving the control information to the loss-of-validity time for the control information.

When the valid time period for the control information elapses, the control information becomes invalid or may be deleted.

In another implementation, timing of the valid duration of the control information may be started from the time of transmitting or receiving the control information. When the valid duration of the control information elapses, the control information becomes invalid or may be deleted.

In an implementation, the controlling related behavior of obtaining location of the terminal indicates whether the related behavior of obtaining location of the terminal is allowed. Optionally, the controlling related behavior of obtaining location of the terminal includes at least one of the following:
  whether a location service request specific to the terminal is allowed;
  whether a location service request specific to the terminal is allowed, where the location service request comes from a location service client (for example, AF or LCS Client);
  whether to transmit to the terminal a privacy verification request in response to a location service request;
  whether to obtain the location of the terminal;
  whether to trigger the terminal to perform location measurement; and
  whether to transmit an obtained location of the terminal to the location service client.

In an implementation, when a location service request specific to the terminal is received, related behavior of obtaining location of the terminal is controlled based on the information related to the first valid time and/or the control information.

In an implementation, when it is determined that a predetermined condition is satisfied, the control information and/or the information related to the first valid time are transmitted.

The predetermined condition may include, but is not limited to, at least one of the following:
  the control information is generated and/or updated;
  an acquisition request for obtaining the location of the terminal is received;
  a verification request for obtaining the location of the terminal is received;
  a request for obtaining the current control information is received; and
  a request for obtaining the updated control information when the control information is changed is received.

The control information transmitted above may be control information that is generated and/or updated based on an operation input by the user. The control information may be privacy information of the user and/or the terminal about obtaining location of the terminal, for example, privacy information of the user and/or the terminal about location service (LCS).

For example, if the user wants to protect location privacy, the control information may be generated to prohibit related behavior of obtaining location of the terminal. If the user wants to disclose the location of the terminal subsequently, the control information may be updated to allow related behavior of obtaining location of the terminal.

Alternatively, the control information may be generated intelligently by the terminal. For example, when the terminal has relatively low power (for example, when the terminal enters a power saving mode) or has excessively large measurement overheads to affect other services of the UE, the control information may be generated to prohibit related behavior of obtaining location of the terminal. When the terminal has sufficient power or is idle subsequently, the control information may be updated to allow obtaining the location of the terminal and/or disclosing the location of the terminal to a third party; or vice versa. This is not limited in this embodiment of this disclosure.

Step 201 may be transmitting, to the second communications unit, the information related to the first valid time and/or the control information, for example, a non-access stratum (NAS) message, an LTE positioning protocol (LPP) message, an NR positioning protocol (NRPP) message, or a radio resource control (RRC) message.

In this embodiment of this disclosure, the information related to the first valid time and/or the control information are transmitted, where the control information is used to control related behavior of obtaining location of the terminal, so as to support the terminal to provide control on location privacy information, and avoid frequent update of location privacy information or frequent enquiry for privacy verification, thereby reducing some insignificant signaling overheads, reducing transmission resources, and reducing power consumption of the terminal. In addition, the information related to the first valid time is transmitted, to effectively control validity of the control information. This further avoids frequent update of location privacy information or frequent enquiry for privacy verification, or avoids a case in which the terminal location cannot be obtained all the time, thereby improving control effects on obtaining the location of the terminal.

Figure 3:
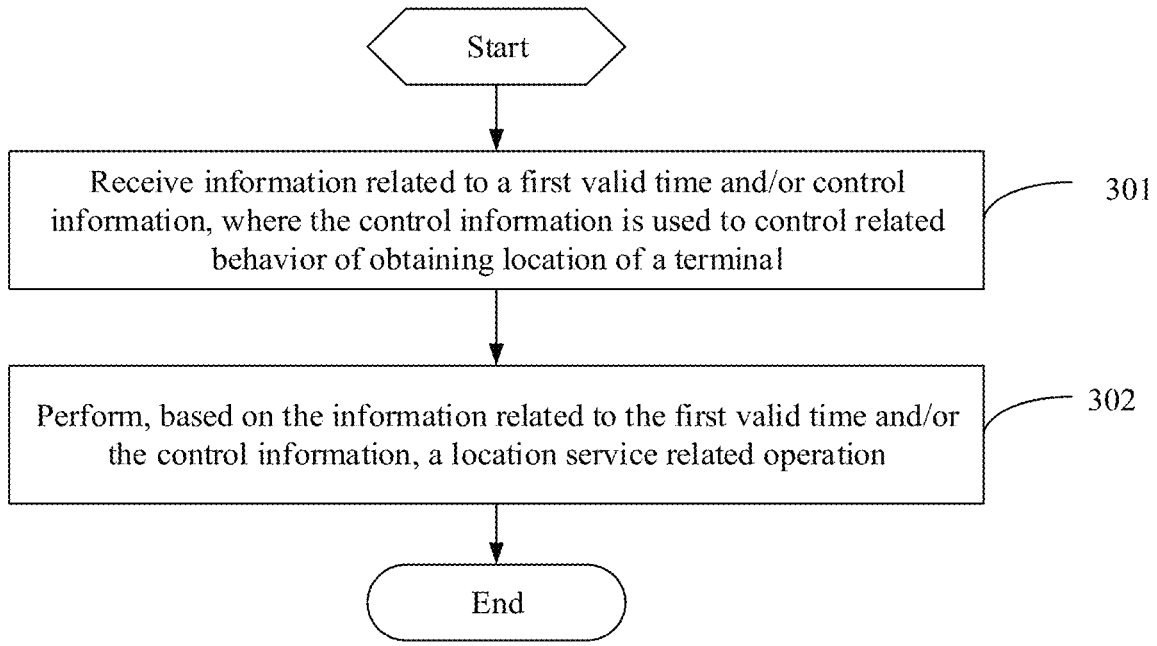
FIG. 3 is a flowchart of another method for location service control according to an embodiment of this disclosure.
Figure 4:
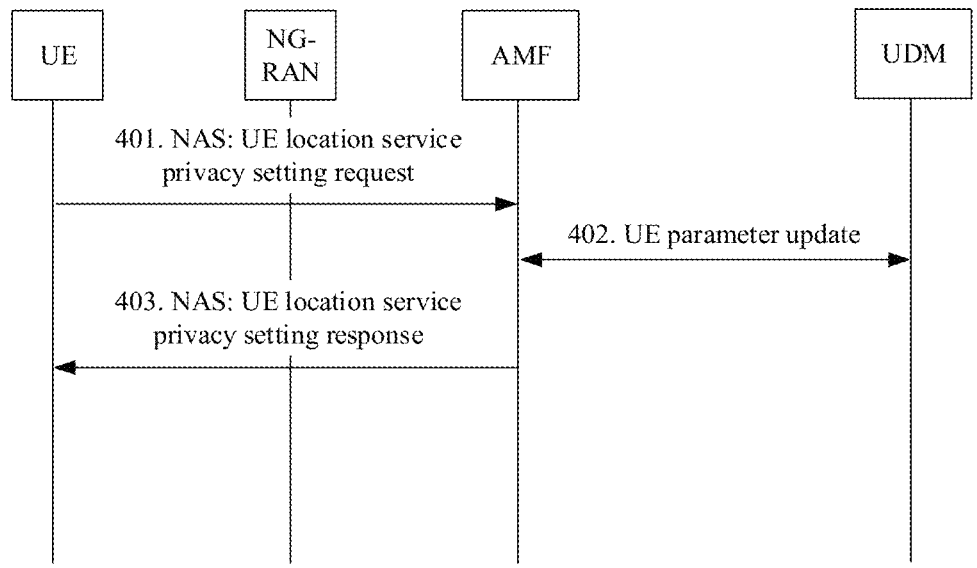
FIG. 4 is a schematic diagram of a method for location service control according to an embodiment of this disclosure.

Referring to FIG. 3, FIG. 3 is a schematic diagram of another method for location service control according to an embodiment of this disclosure. The method is applied to a second communications unit, and the second communications unit includes but is not limited to at least one of the following: a RAN network element, a CN network element (for example AMF, LMF, E-GMLC, GMLC, or AF), a location service client (for example, LCS client (which may be software or hardware) or AF). As shown in FIG. 4, the following steps are included.

Step 301: Receive information related to a first valid time and/or control information, where the control information is used to control related behavior of obtaining location of a terminal.

Step 302: Perform, based on the information related to the first valid time and/or the control information, a location service related operation.

In an implementation, when a location service request specific to UE is received, related behavior of obtaining location of the terminal is performed based on the information related to the first valid time and/or the control information.

In an implementation, the information related to the first valid time includes the information related to the valid time for the control information. The information related to the first valid time may further include at least one of the following: information related to a valid time for the control information per terminal, and information related to a valid time for the control information per location service client. The first valid time may be an information element different from the control information, or may be included in the control information. The control information may be other information than the information related to the first valid time in the control information.

Optionally, the information related to the first valid time includes at least one of the following: time period information for the control information and valid duration of the control information, where the time period information for the control information is used to indicate a valid time period for the control information. The time period information may also be referred to as valid time period information for the control information. The control information may be other information than the information related to the first valid time in the control information.

In an implementation, when the information related to the first valid time does not exit, the control information remains valid all the time.

Optionally, the time period information for the control information includes at least one of the following: a start-of-validity time for the control information, an end-of-validity time for the control information, and a loss-of-validity time for the control information.

That is, the valid time period for the control information may be indicated by at least one of the start-of-validity time for the control information, the end-of-validity time for the control information, and the loss-of-validity time for the control information.

In an implementation, the valid time period for the control information is between the start-of-validity time for the control information and the end-of-validity time for the control information. When the valid time period information for the control information does not include the start-of-validity time, a time of transmitting or receiving the control information is the start-of-validity time.

In another implementation, the valid time period for the control information is from the time of transmitting or receiving the control information to the loss-of-validity time for the control information.

When the valid time period for the control information elapses, the control information becomes invalid or may be deleted.

In another implementation, timing of the valid duration of the control information may be started from the time of transmitting or receiving the control information. When the valid duration of the control information elapses, the control information becomes invalid or may be deleted.

That the control information is used to control related behavior of obtaining location of the terminal is specifically described in the embodiment of FIG. 2. Details are not described herein again.

Optionally, the location service related operation includes at least one of the following:
- transmitting the information related to the first valid time and/or the control information to another communication network element and/or location service client;
- storing the information related to the first valid time and/or the control information; starting a timer based on the information related to the first valid time;
- determining a valid time period for the control information based on the information related to the first valid time;
- during the valid time period for the control information, controlling, based on the control information, related behavior of obtaining location of the terminal;
- deleting the control information when a valid time for the control information expires or a loss-of-validity time arrives; and
- controlling related behavior of obtaining location of the terminal.

In an implementation, after receiving the information related to the first valid time and/or the control information, the AMF or NEF transmits the information related to the first valid time and/or the control information to the UDM.

In an implementation, after receiving the information related to the first valid time and/or the control information, the UDM transmits the information related to the first valid time and/or the control information to the UDR.

In an implementation, the UDR stores the information related to the first valid time and/or the control information.

In an implementation, the UDR transmits the information related to the first valid time and/or the control information to a subscribed network element (such as NF (for example, GMLC or NEF)).

In an implementation, within the valid time period for the control information, whether to allow the location service request specific to the UE is determined based on the control information.

In an implementation, the control information is deleted when a valid time for the control information expires or a loss-of-validity time arrives.

In an implementation, when the valid time for the control information expires or the loss-of-validity time arrives, it can be considered that the control information does not exist (for example, there is no privacy information about obtaining location of the UE). When a location request for which privacy verification by the terminal is required, a privacy verification request in response to the location service request is transmitted to the terminal, requesting the terminal to determine whether to authorize the location service request (for example, LCS service request).

Optionally, the controlling related behavior of obtaining location of the terminal includes at least one of the following:
- whether a location service request specific to the terminal is allowed;
- whether a location service request specific to the terminal is allowed, where the location service request comes from a location service client (for example, LCS client (including AF));
- whether to transmit to the terminal a privacy verification request in response to a location service request;
- whether to obtain the location of the terminal;
- whether to trigger the terminal to perform location measurement; and
- whether to transmit an obtained location of the terminal to the location service client.

In an implementation, the controlling related behavior of obtaining location of the terminal includes at least one of the following: determining whether the related behavior of obtaining location of the terminal is allowed, executing allowing related behavior of obtaining location of the terminal, and executing prohibiting related behavior of obtaining location of the terminal.

In an implementation, when a location service request specific to the terminal is received, related behavior of obtaining location of the terminal is controlled based on the information related to the first valid time and/or the control information.

In an implementation, the executing prohibiting related behavior of obtaining location of the terminal includes but is not limited to at least one of the following:

prohibiting a location service request specific to the terminal;

prohibiting a location service request specific to the terminal, where the location service request comes from a location service client that is not allowed;

directly returning a terminal location acquisition failure or rejecting the terminal location request, upon reception of a location request specific to the terminal;

skipping transmitting, to the terminal, a privacy verification request for obtaining the location of the terminal;

skipping obtaining the location of the terminal;

skipping triggering the terminal to perform location measurement; and skipping transmitting, to the location service client, an obtained location of the terminal.

In an implementation, the executing allowing related behavior of obtaining location of the terminal includes at least one of the following:

allowing location service request specific to the terminal;

allowing a location service request specific to the terminal, where the location service request comes from a location service client that is allowed;

transmitting, to the terminal, a privacy verification request for obtaining the location of the terminal;

obtaining the location of the terminal;

triggering the terminal to perform location measurement; and obtaining the location of the terminal in response to a received location service request specific to the terminal.

It should be noted that this embodiment of this disclosure is used as an implementation of the network unit or the location service client corresponding to the embodiment shown in FIG. 2. For specific implementations, reference may be made to the related description of the embodiment shown in FIG. 2 and the same beneficial effects can be achieved. To avoid repetition, details are not described herein again.

Referring to FIG. 4, FIG. 4 is a schematic diagram of another method for location service control according to an embodiment of this disclosure. As shown in FIG. 4, the following steps are included.

Step 401: UE transmits, to a core network element (for example, AMF or MME), first information, including control information (also referred to as privacy information for obtaining location of the UE) and/or information related to a first valid time. Optionally, the UE may transmit the first information to the core network element by using a UE location service privacy setting request in a NAS message, an LPPA message, or an NRPPA message.

Specifically, the information related to the first valid time and/or the control information is as described in the embodiment of FIG. 2.

Step 402: The AMF transmits the first information to a UDM after receiving the first information.

The UDM transmits the first information to a UDR, for example, by performing a service operation of UE parameter updating.

The UDR stores the first information and notifies a subscribed network element.

Step 403: The core network element (for example, AMF or MME) transmits a response to the UE. The response may be a UE location service privacy setting response.

Subsequently, the second communications unit (LMF, AMF, GMLC, or NEF) performs a location service related operation based on the information related to the first valid time and/or the control information. For details, refer to the description in the embodiment of FIG. 3.

Figure 5:
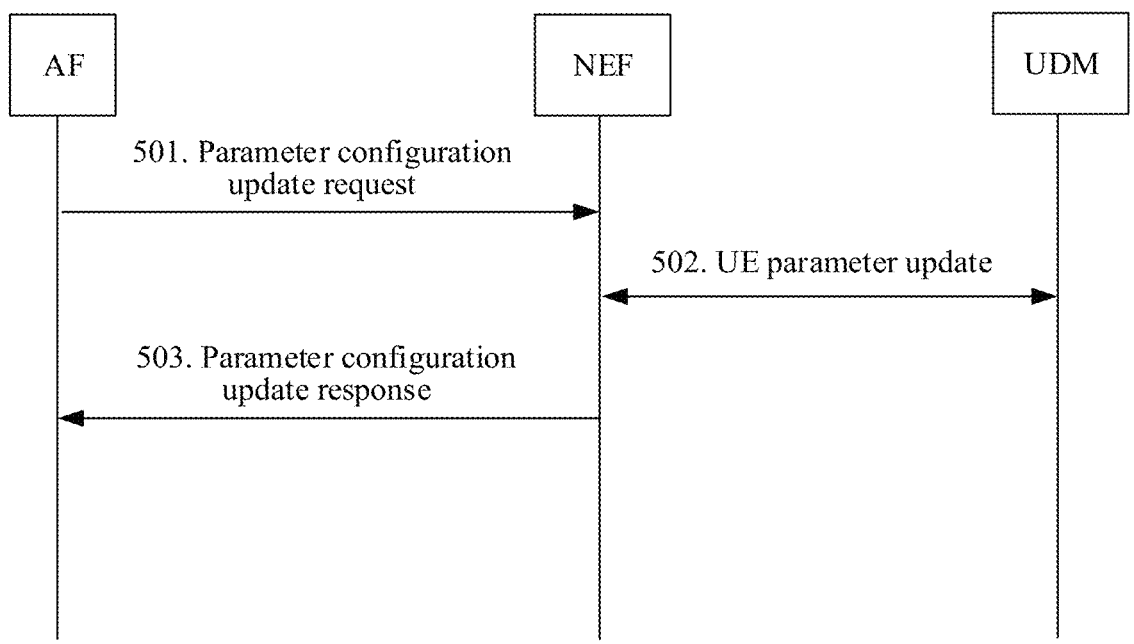
FIG. 5 is a schematic diagram of another method for location service control according to an embodiment of this disclosure.

Referring to FIG. 5, FIG. 5 is a schematic diagram of another method for location service control according to an embodiment of this disclosure. As shown in FIG. 5, the following steps are included.

Step 501: An AF transmits, to an NEF or a UDM, first information, including control information (also referred to as privacy information for obtaining location of the UE) and/or information related to a first valid time. Optionally, the AF may transmit the first information to the NEF or UDM by using a UE location service privacy setting request or a parameter configuration update request.

Specifically, the information related to the first valid time and/or the control information is as described in the embodiment of FIG. 2.

Step 502: The NEF transmits the first information to the UDM after receiving the first information.

The UDM transmits the first information to a UDR, for example, by performing a service operation of UE parameter updating.

The UDR stores the first information and notifies a subscribed network element.

Step 503: The core network element (for example, AMF or MME) transmits a response to the UE. The response may be a UE location service privacy setting response or a parameter configuration update response.

Subsequently, the second communications unit (an LMF, AMF, GMLC, or NEF) performs a location service related operation based on the information related to the first valid time and/or the control information. For details, refer to the description in the embodiment of FIG. 3.

Figure 6:
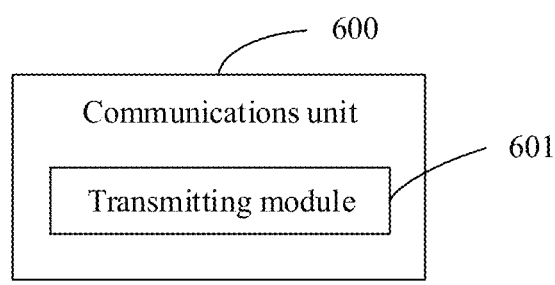
FIG. 6 is a structural diagram of a communications device according to an embodiment of this disclosure.

Referring to FIG. 6, FIG. 6 is a first structural diagram of a communications unit according to an embodiment of this disclosure. The communications unit in this embodiment is the first communications unit in the foregoing method embodiment. As shown in FIG. 6, the communications unit 600 includes:

a transmitting module 601, configured to transmit information related to a first valid time and/or control information, where the control information is used to control related behavior of obtaining location of a terminal.

Optionally, the control information includes at least one of the following:

control information per terminal and control information per location service client.

Optionally, the control information per terminal includes at least one of the following:

the information related to the first valid time;

first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and second indication information, where the second indication information indicates at least one of the following: whether the first indication information is applicable to all location service clients; information related to a location service client to which the control information is applicable; and information related to a location service client for which the control information is not applicable;

and/or, the control information per location service client includes at least one of the following: information related to a location service client;

the information related to the first valid time; and third indication information, where the third indication information indicates at least one of the following: whether a subsequent location service request specific to the terminal is allowed, where the location service request comes from the location service client.

Optionally, the control information includes at least one of the following:

the information related to the first valid time;

first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and second indication information, where the second indication information indicates at least one of the following: whether the first indication information is applicable to all location service clients; information related to a location service client to which the control information is applicable; and information related to a location service client for which the control information is not applicable.

Optionally, the information related to the first valid time includes at least one of the following:

time period information for the control information and valid duration of the control information, where the time period information for the control information is used to indicate a valid time period for the control information.

Optionally, the time period information for the control information includes at least one of the following:

a start-of-validity time for the control information, an end-of-validity time for the control information, and a loss-of-validity time for the control information.

Optionally, the controlling related behavior of obtaining location of a terminal includes at least one of the following:

whether a location service request specific to the terminal is allowed;

whether a location service request specific to the terminal is allowed, where the location service request comes from a location service client;

whether to transmit a privacy verification request for a location service request to the terminal;

whether to obtain the location of the terminal;

whether to trigger the terminal to perform location measurement; and whether to transmit an obtained location of the terminal to the location service client.

The communications unit 600 is capable of implementing the processes implemented by the first communications unit in the method embodiment of this disclosure, with the same beneficial effects achieved. To avoid repetition, details are not described herein again.

Figure 7:
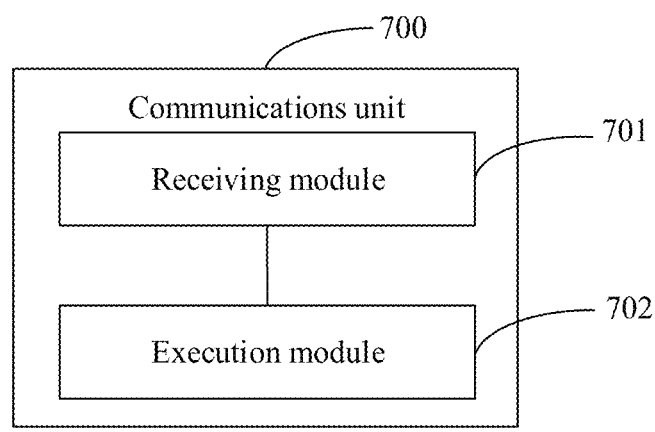
FIG. 7 is a structural diagram of another communications device according to an embodiment of this disclosure.

Referring to FIG. 7, FIG. 7 is a second structural diagram of a communications unit according to an embodiment of this disclosure. The communications unit in this embodiment is the second communications unit in the foregoing method embodiment. As shown in FIG. 7, the communications unit 700 includes:

a receiving module 701, configured to receive information related to a first valid time and/or control information, where the control information is used to control related behavior of obtaining location of a terminal; and an execution module 702, configured to perform, based on the information related to the first valid time and/or the control information, a location service related operation.

Optionally, the control information includes at least one of the following:

control information per terminal and control information per location service client.

Optionally, the control information per terminal includes at least one of the following:

the information related to the first valid time;

first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and second indication information, where the second indication information indicates at least one of the following: whether the first indication information is applicable to all location service clients; information related to a location service client to which the control information is applicable; and information related to a location service client for which the control information is not applicable;

and/or, the control information per location service client includes at least one of the following: information related to a location service client;

the information related to the first valid time; and third indication information, where the third indication information indicates at least one of the following: whether a subsequent location service request specific to the terminal is allowed, where the location service request comes from the location service client.

Optionally, the control information includes at least one of the following:

the information related to the first valid time;

first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and second indication information, where the second indication information indicates at least one of the following: whether the first indication information is applicable to all location service clients; information related to a location service client to which the control information is applicable; and information related to a location service client for which the control information is not applicable.

Optionally, the information related to the first valid time includes at least one of the following:
time period information for the control information and valid duration of the control information, where the time period information for the control information is used to indicate a valid time period for the control information.

Optionally, the time period information for the control information includes at least one of the following:
a start-of-validity time for the control information, an end-of-validity time for the control information, and a loss-of-validity time for the control information.

Optionally, the controlling related behavior of obtaining location of a terminal includes at least one of the following:
whether a location service request specific to the terminal is allowed;
whether a location service request specific to the terminal is allowed, where the location service request comes from a location service client;
whether to transmit to the terminal a privacy verification request in response to a location service request;
whether to obtain the location of the terminal;
whether to trigger the terminal to perform location measurement; and
whether to transmit an obtained location of the terminal to the location service client.

Optionally, the location service related operation includes at least one of the following:
transmitting the information related to the first valid time and/or the control information to another communication network element and/or location service client;
storing the information related to the first valid time and/or the control information;
starting a timer based on the information related to the first valid time;
determining a valid time period for the control information based on the information related to the first valid time;
during the valid time period for the control information, controlling, based on the control information, related behavior of obtaining location of the terminal;
deleting the control information when a valid time for the control information expires or a loss-of-validity time arrives; and
controlling related behavior of obtaining location of the terminal.

The communications unit 700 is capable of implementing the processes implemented by the second communications unit in the method embodiment of this disclosure, with the same beneficial effects achieved. To avoid repetition, details are not described herein again.

Figure 8:
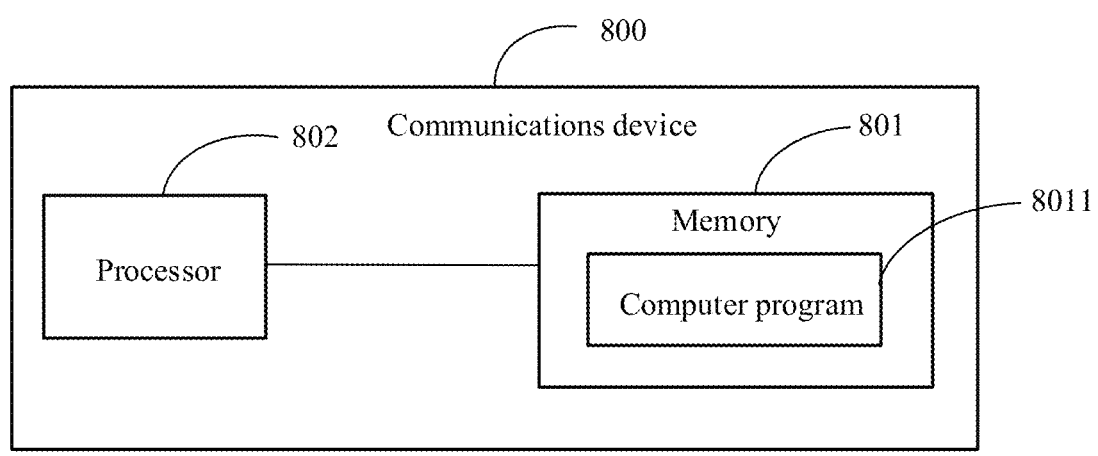
FIG. 8 is a structural diagram of another communications device according to an embodiment of this disclosure.

Referring to FIG. 8, FIG. 8 is a third structural diagram of a communications unit according to an embodiment of this disclosure. As shown in FIG. 8, the communications unit 800 includes a memory 801, a processor 802, and a computer program 8011 stored on the memory 801 and capable of running on the processor 802.

When the communications unit 800 acts as the first communications unit in the foregoing method embodiment, the following steps are implemented when the computer program 8011 is executed by the processor 802:

transmitting information related to a first valid time and/or control information, where the control information is used to control related behavior of obtaining location of a terminal.

Optionally, the control information includes at least one of the following:
control information per terminal and control information per location service client.

Optionally, the control information per terminal includes at least one of the following: the information related to the first valid time;
first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and
second indication information, where the second indication information indicates at least one of the following: whether the first indication information is applicable to all location service clients; information related to a location service client to which the control information is applicable; and information related to a location service client for which the control information is not applicable;
and/or,
the control information per location service client includes at least one of the following: information related to a location service client;
the information related to the first valid time; and
third indication information, where the third indication information indicates at least one of the following: whether a subsequent location service request specific to the terminal is allowed, where the location service request comes from the location service client.

Optionally, the control information includes at least one of the following:
the information related to the first valid time;
first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and
second indication information, where the second indication information indicates at least one of the following: whether the first indication information is applicable to all location service clients; information related to a location service client to which the control information is applicable; and information related to a location service client for which the control information is not applicable.

Optionally, the information related to the first valid time includes at least one of the following:
time period information for the control information and valid duration of the control information, where the time period information for the control information is used to indicate a valid time period for the control information.

Optionally, the time period information for the control information includes at least one of the following:
  a start-of-validity time for the control information, an end-of-validity time for the control information, and a loss-of-validity time for the control information.

Optionally, the controlling related behavior of obtaining location of a terminal includes at least one of the following:
  whether a location service request specific to the terminal is allowed;
  whether a location service request specific to the terminal is allowed, where the location service request comes from a location service client;
  whether to transmit to the terminal a privacy verification request in response to a location service request;
  whether to obtain the location of the terminal;
  whether to trigger the terminal to perform location measurement; and
  whether to transmit an obtained location of the terminal to the location service client.

When the communications unit 800 acts as the second communications unit in the foregoing method embodiment, the following steps are implemented when the computer program 8011 is executed by the processor 802:
  receiving information related to a first valid time and/or control information, where the control information is used to control related behavior of obtaining location of a terminal; and
  performing, based on the information related to the first valid time and/or the control information, a location service related operation.

Optionally, the control information includes at least one of the following:
  control information per terminal and control information per location service client.

Optionally, the control information per terminal includes at least one of the following:
  the information related to the first valid time;
  first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and
  second indication information, where the second indication information indicates at least one of the following: whether the first indication information is applicable to all location service clients; information related to a location service client to which the control information is applicable; and information related to a location service client for which the control information is not applicable;
and/or,
  the control information per location service client includes at least one of the following: information related to a location service client;
  the information related to the first valid time; and
  third indication information, where the third indication information indicates at least one of the following: whether a subsequent location service request specific to the terminal is allowed, where the location service request comes from the location service client.

Optionally, the control information includes at least one of the following:
  the information related to the first valid time;
  first indication information, where the first indication information indicates at least one of the following: whether the related behavior of obtaining location of the terminal is allowed, whether subsequent related behavior of obtaining location of the terminal is allowed by the terminal, whether a subsequent location service request specific to the terminal is allowed, that a subsequent location service request specific to the terminal is allowed, and that a subsequent location service request specific to the terminal is not allowed; and
  second indication information, where the second indication information indicates at least one of the following: whether the first indication information is applicable to all location service clients; information related to a location service client to which the control information is applicable; and information related to a location service client for which the control information is not applicable.

Optionally, the information related to the first valid time includes at least one of the following:
  time period information for the control information and valid duration of the control information, where the time period information for the control information is used to indicate a valid time period for the control information.

Optionally, the time period information for the control information includes at least one of the following:
  a start-of-validity time for the control information, an end-of-validity time for the control information, and a loss-of-validity time for the control information.

Optionally, the controlling related behavior of obtaining location of a terminal includes at least one of the following:
  whether a location service request specific to the terminal is allowed;
  whether a location service request specific to the terminal is allowed, where the location service request comes from a location service client;
  whether to transmit to the terminal a privacy verification request in response to a location service request;
  whether to obtain the location of the terminal;
  whether to trigger the terminal to perform location measurement; and
  whether to transmit an obtained location of the terminal to the location service client.

Optionally, the location service related operation includes at least one of the following:
  transmitting the information related to the first valid time and/or the control information to another communication network element and/or location service client;
  storing the information related to the first valid time and/or the control information;
  starting a timer based on the information related to the first valid time;
  determining a valid time period for the control information based on the information related to the first valid time;
  during the valid time period for the control information, controlling, based on the control information, related behavior of obtaining location of the terminal;

deleting the control information when a valid time for the control information expires or a loss-of-validity time arrives; and controlling related behavior of obtaining location of the terminal.

The communications unit 800 is capable of implementing each process implemented by the communications unit in the foregoing method embodiments. To avoid repetition, details are not described herein again.

An embodiment of this disclosure further provides a computer readable storage medium, where a computer program is stored in the computer readable storage medium. When the computer program is executed by a processor, the processes of any one of the foregoing embodiments of the method for location service control can be implemented, with the same effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A communications unit, comprising a processor, a memory, and a program stored in the memory and capable of running on the processor, wherein the program is executed by the processor to perform:

receiving control information and time period information for the control information from a first communications unit including a terminal; and performing, based on the control information and the time period information for the control information, a location service related operation;

wherein the control information comprises:

first indication information, wherein the first indication information indicates at least one of the following: whether subsequent related behavior of obtaining location of the terminal is allowed by the terminal, whether a subsequent location service request specific to the terminal is allowed, that a subsequent location service request specific to the terminal is allowed, or that a subsequent location service request specific to the terminal is not allowed; and the time period information for the control information is used to indicate a valid time period for the control information;

the communications unit comprises a radio access network (RAN) network element, a core network (CN) network element, a location service client, or an application function (AF);

wherein the location service related operation comprises at least one of the following:

transmitting the time period information for the control information and the control information to another communication network element and/or location service client;

storing the time period information for the control information and the control information;

starting a timer based on the time period information for the control information;

determining a valid time period for the control information based on the time period information for the control information;

during the valid time period for the control information, controlling, based on the control information, related behavior of obtaining location of the terminal;

deleting the control information when a valid time for the control information expires or a loss-of-validity time arrives; or controlling related behavior of obtaining location of the terminal.

2. The communications unit according to claim 1, wherein the control information comprises at least one of the following:

control information per terminal or control information per location service client.

3. The communications unit according to claim 2, wherein the control information further comprises:

second indication information, wherein the second indication information indicates at least one of the following: whether the first indication information is applicable to all location service clients; information related to a location service client to which the control information is applicable; or information related to a location service client for which the control information is not applicable;

and/or, the control information per location service client comprises at least one of the following:

information related to a location service client;

the time period information for the control information; or, third indication information, wherein the third indication information indicates: whether a subsequent location service request specific to the terminal is allowed, wherein the location service request comes from the location service client.

4. The communications unit according to claim 1, wherein the time period information for the control information comprises at least one of the following:

a validity start time for the control information, a validity end time for the control information, or a loss-of-validity time for the control information.

5. A non-transitory computer-readable storage medium, wherein a computer program is stored in the non-transitory computer-readable storage medium, and the computer program is executed by a processor to perform:

transmitting control information and time period information for the control information to a communications unit;

wherein the control information comprises:

first indication information, wherein the first indication information indicates at least one of the following: whether subsequent related behavior of obtaining location of the terminal is allowed by the terminal, whether a subsequent location service request specific to the terminal is allowed, that a subsequent location service request specific to the terminal is allowed, or that a subsequent location service request specific to the terminal is not allowed; and the time period information for the control information is used to indicate a valid time period for the control information;

the communications unit comprises a radio access network (RAN) network element, a core network (CN) network element, a location service client, or an application function (AF).

6. The non-transitory computer-readable storage medium according to claim 5, wherein the control information is used to control related behavior of obtaining location of the terminal;

the control information comprises at least one of the following:

control information per terminal or control information per location service client.

7. The non-transitory computer-readable storage medium according to claim 6, wherein the control information further comprises:

second indication information, wherein the second indication information indicates at least one of the following: whether the first indication information is applicable to all location service clients; information related to a location service client to which the control information is applicable; or information related to a location service client for which the control information is not applicable;

and/or, the control information per location service client comprises at least one of the following:

information related to a location service client;

the time period information for the control information; or, third indication information, wherein the third indication information indicates: whether a subsequent location service request specific to the terminal is allowed, wherein the location service request comes from the location service client.

8. The non-transitory computer-readable storage medium according to claim 5, wherein the time period information for the control information comprises at least one of the following:

a validity start time for the control information, a validity end time for the control information, or a loss-of-validity time for the control information.

9. The non-transitory computer-readable storage medium according to claim 6, wherein the controlling related behavior of obtaining location of a terminal comprises at least one of the following:

whether a location service request specific to the terminal is allowed;

whether a location service request specific to the terminal is allowed, wherein the location service request comes from a location service client;

whether to transmit to the terminal a privacy verification request in response to a location service request;

whether to obtain the location of the terminal;

whether to trigger the terminal to perform location measurement; or, whether to transmit an obtained location of the terminal to the location service client.

10. A non-transitory computer-readable storage medium, wherein a computer program is stored in the non-transitory computer-readable storage medium, and the computer program is executed by a processor to perform:

receiving control information and time period information for the control information from a first communications unit including a terminal; and performing, based on the control information and the time period information for the control information, a location service related operation;

wherein the control information comprises:

first indication information, wherein the first indication information indicates at least one of the following: whether subsequent related behavior of obtaining location of the terminal is allowed by the terminal, whether a subsequent location service request specific to the terminal is allowed, that a subsequent location service request specific to the terminal is allowed, or that a subsequent location service request specific to the terminal is not allowed; and the time period information for the control information is used to indicate a valid time period for the control information;

wherein the location service related operation comprises at least one of the following:

transmitting the time period information for the control information and the control information to another communication network element and/or location service client;

storing the time period information for the control information and the control information;

starting a timer based on the time period information for the control information;

determining a valid time period for the control information based on the time period information for the control information;

during the valid time period for the control information, controlling, based on the control information, related behavior of obtaining location of the terminal;

deleting the control information when a valid time for the control information expires or a loss-of-validity time arrives; or controlling related behavior of obtaining location of the terminal.

11. The non-transitory computer-readable storage medium according to claim 10, wherein the control information comprises at least one of the following:

control information per terminal or control information per location service client.

12. The non-transitory computer-readable storage medium according to claim 11, wherein the control information further comprises:

second indication information, wherein the second indication information indicates at least one of the following: whether the first indication information is applicable to all location service clients; information related to a location service client to which the control information is applicable; or information related to a location service client for which the control information is not applicable;

and/or, the control information per location service client comprises at least one of the following:

information related to a location service client;

the time period information for the control information; or, third indication information, wherein the third indication information indicates: whether a subsequent location service request specific to the terminal is allowed, wherein the location service request comes from the location service client.

13. The non-transitory computer-readable storage medium according to claim 10, wherein the time period information for the control information comprises at least one of the following:

a validity start time for the control information, a validity end time for the control information, or a loss-of-validity time for the control information.

* * * * *